(No Model.)
A. PHELPS.
CLOCK.
No. 391,271. Patented Oct. 16, 1888.
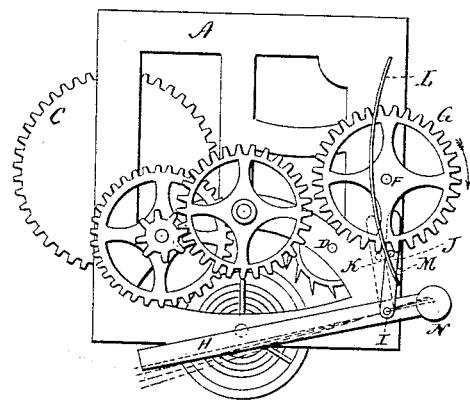
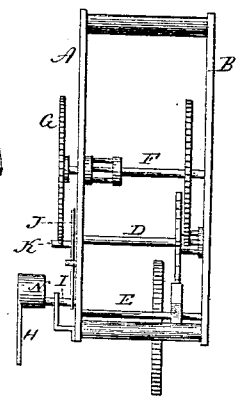
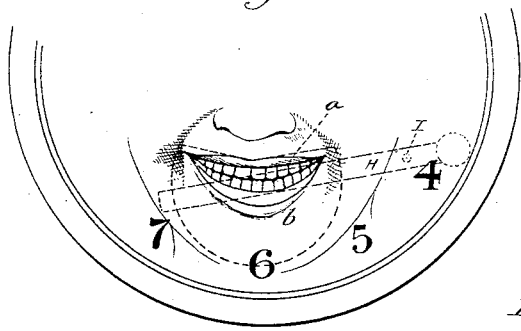
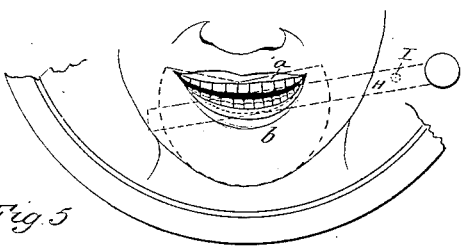
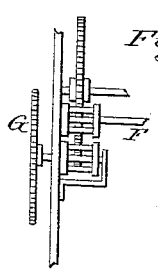
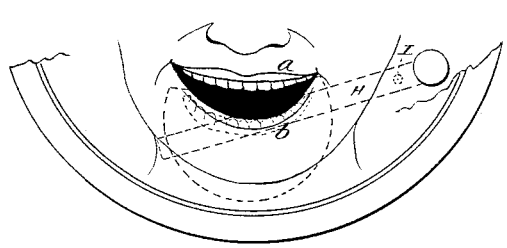
Witnesses
Albert Phelps, Inventor
By Atty
N. PETERS, Photo-Lithographer, Washington, D. C.

UNITED STATES PATENT OFFICE.

ALBERT PHELPS, OF ANSONIA, CONNECTICUT.

CLOCK.

SPECIFICATION forming part of Letters Patent No. 391,271, dated October 16, 1888.

Application filed June 18, 1888. Serial No. 277,460. (No model.)

*To all whom it may concern:*

Be it known that I, ALBERT PHELPS, of Ansonia, in the county of New Haven and State of Connecticut, have invented a new Improvement in Clocks; and I do hereby declare the following, when taken in connection with accompanying drawings and the letters of reference marked thereon, to be a full, clear, and exact description of the same, and which said drawings constitute part of this specification, and represent, in—

Figure 1, a front view of so much of the clock-movement as is necessary for the illustration of the invention; Fig. 2, a side view of the same; Figs. 3, 4, and 5, partial views of a dial, illustrating the use of the invention; Fig. 6, a modification.

This invention relates to an improvement in that class of clocks in which the clock-movement is made to operate a mechanical figure or device appearing on the dial other than the pointers—such, for illustration, as a moving human figure or part of the figure. The movement is imparted to the figure by a vibration induced from the clock-movement, and this vibration is usually taken from the pallet-arbor, the vibration corresponding to the oscillation of that shaft. In deriving the power through the pallet-arbor, the most distant from the source of the power, the device to be operated proves to be a very considerable load upon the clock-movement and unavoidably affects the regular or true working of the clock. Again, the movement of the device must correspond to the oscillation of the pallet-arbor, and in small clocks is unavoidably rapid, much more so than desirable in many cases.

The object of my invention is to provide for the movement of the device at a point nearer the source of power, and whereby an intermittent movement in one direction may be imparted to such device; and it consists in a toothed wheel applied to the second shaft, or between the escape-wheel and main wheel, combined with a lever arranged to swing in the plane of the wheels of the clock-movement, with a projection from said lever adapted to engage the teeth of the said applied wheel, and whereby the said teeth in the intermittent rotation of the said wheel will operate upon said lever to produce a step-by-step swing in one direction until the lever escapes from the teeth of the wheel, and so that when so escaping the lever will return to its normal position, and as more fully hereinafter described.

A B represent the two plates of a clock-movement of common construction, C representing the main wheel, D the escape-wheel arbor, E the pallet arbor, and F the second-wheel arbor, all in the usual arrangement and with the usual train of gearing between the main wheel to communicate power through the second-shaft to the escape-wheel.

On the second-shaft, and preferably outside the plate A, I arrange a toothed wheel, G, fast upon the arbor F, and so as to revolve therewith; but, as usual in clock-movements, the arbor F of the second-wheel and the wheel G thereon will revolve in a step-by-step movement, according to the play of the pallets upon the escape-wheel.

To the frame a lever, H, is hung—say upon a fulcrum, I—so as to swing in a plane parallel with the wheels of the clock-movement. The fulcrum I is an arbor supported in suitable bearings, as indicated in Figs. 1 and 2, and from the shaft or lever an arm, J, extends upward, preferably in rear of the wheel G, but is in rigid connection with the lever H and so as to vibrate therewith. From the arm J is a projecting stud, K, which stands in the path of the teeth of the wheel G. A spring, L, is arranged to operate upon the lever H, (here represented as through the arm J,) the tendency of the spring being to hold the lever H up in its normal position and against a stationary stop, M. The rotation of the wheel G is in the direction indicated by the arrow, Fig. 1. As that wheel rotates step by step under the operation of the clock-movement, one tooth engages the stud K on the arm J, so that the advancing force of that tooth on the wheel G is imparted to the said arm J and thence to the lever, causing the lever to turn upon its fulcrum with the arm J until the tooth of the wheel G may escape from the stud K, as indicated in broken lines, Fig. 1. As here represented, this escape occurs after four steps have been made by the wheel G. The broken lines radiating from the fulcrum of the lever H indicate the four steps of vibration which the movement of the wheel G will impart to the said lever H. As the stud K escapes from the teeth of the wheel G, which advanced it, the spring reacts and throws the lever H of the arm J back to its stop M, or normal position, indicated in Fig. 1, where the next tooth of the wheel G will engage the arm J, as before, and impart the step-by-step swinging movement to the lever H until the stud escapes from the second tooth, when the lever will return, as before, and so continuing, each successive tooth imparting the four steps in the swinging movement of the said lever H.

It will be understood that the number of steps which will be imparted to the said lever H depends upon the time which the lever may remain in engagement with the wheel G, and may be greater or less, according to circumstances. Preferably the lever is provided with a counter-balance, N, and this may be of sufficient weight to serve as an equivalent for the spring, in which case the spring may be dispensed with. By the term "spring" I wish to be understood as including known equivalents therefor. The intermittent movement of the lever will impart to the object which it carries a like intermittent movement.

I illustrate in Figs. 3, 4, and 5 the lever as applied to the lower jaw of a face, there being an opening, say, in the dial, in which the upper jaw, $a$, is represented as stationary, while the representation of the lower jaw is on a disk, $b$, carried by the lever H in rear of the said opening. When the lever is in its normal position, the jaws will appear as closed, as represented in Fig. 3. Under the first vibration the jaw will appear to have opened slightly, as seen in Fig. 4, and then another step, making a still further opening, as represented in broken lines, Fig. 4, and so on until the extreme movement of the lever H is reached, bringing the jaw to the wide-open position seen in Fig. 5. The illustration of the device as applied to the movement of a jaw will be sufficient to indicate the application of the invention to the movement of various figures or parts of figures. The appearance given to the jaw and to the figure is slowly opening step by step, but the closing or return is instantaneous upon the escape of the lever H from the operating-tooth of the wheel G. I therefore do not wish to limit the invention to the operation of any particular figure or class of figures.

It will also be understood that the power for the clock-movement may be derived from a spring or weight, or that the pallet may be operated as a lever, or as a pendulum, as common in clock-movements.

Instead of attaching the lever-operating wheel directly to one of the arbors of the movement, it may be supported upon an arbor or bearing of its own, and be in gear-connection with another arbor of the movement, as represented in Fig. 6.

I claim—

1. In a clock-movement substantially such as described, the combination therewith of a toothed wheel arranged upon an arbor, and between the arbor of the escape-wheel and the arbor of the main wheel, a lever hung to swing in a plane parallel with said toothed wheel, with a projection therefrom in the path of the teeth of said toothed wheel, and whereby the teeth of the said toothed wheel will successively engage said lever and impart a step-by-step swinging movement to the said lever in one direction, with a spring arranged to return said lever as it escapes from its engagement with the said teeth of said wheel, and a figure the whole or a portion of which is attached to said lever so as to move therewith, substantially as described, and whereby said figure or part of a figure is moved in one direction in a step-by-step movement and returned at a single step.

2. In a clock-movement substantially such as described, the combination therewith of a toothed wheel arranged between the escape-wheel and the main wheel, but in connection with the wheels of the clock-movement, so as to receive a step-by-step rotation, a lever hung to swing in a plane parallel with said toothed wheel, with a projection therefrom in the path of the teeth of said toothed wheel, and whereby the teeth of the said toothed wheel will successively engage said lever and impart a step-by-step swinging movement to the said lever in one direction, with mechanism, substantially such as described, to return said lever as it escapes from its engagement with the said toothed wheel, and a figure the whole or a portion of which is attached to said lever so as to move therewith, substantially as described, and whereby the said figure or part of a figure is moved in one direction in a step-by-step movement and returned at a single step.

ALBERT PHELPS.

Witnesses:
 JOHN E. EARLE,
 J. H. SHUMWAY.